United States Patent [19]
Takei et al.

[11] 3,922,925
[45] Dec. 2, 1975

[54] DEVICES FOR CONTROLLING OPENING AND CLOSING OF PRESSURE DOORS AND PRESSURE DOOR EQUIPMENTS INCORPORATING SAID CONTROL DEVICES

[75] Inventors: Kiyomi Takei; Katsumi Takahashi; Kazuo Kanazawa, all of Yokohama, Japan

[73] Assignee: Ishikawajima-Harima Jukogyo Kabushiki Kaisha, Tokyo, Japan

[22] Filed: Dec. 21, 1973

[21] Appl. No.: 427,049

[52] U.S. Cl. .................. 74/53; 74/89.18; 292/34
[51] Int. Cl.² ... F16H 25/08; E05C 9/12; E05C 9/14
[58] Field of Search ......... 74/53, 89.18, 89; 292/32, 292/34

[56] References Cited
UNITED STATES PATENTS
645,448    3/1900    Blechschmidt ................ 292/34

FOREIGN PATENTS OR APPLICATIONS
357,341    3/1938    Italy ..................... 292/34
805,565    11/1936   France ................... 292/34

Primary Examiner—Samuel Scott
Assistant Examiner—F. D. Shoemaker
Attorney, Agent, or Firm—Scrivener Parker Scrivener & Clarke

[57] ABSTRACT

A plurality of operating rods which are operatively coupled to various mechanisms for controlling the opening or closing of a pressure door or the like are sequentially operated by a cam disk which in turn is rotated through suitable reduction gear means by a handlewheel so that the steps for opening a pressure door or the like may be carried out sequentially. A pressure door equipment having a plurality of pressure doors and incorporating the control device of the type described is also disclosed.

4 Claims, 10 Drawing Figures

DEVICES FOR CONTROLLING OPENING AND CLOSING OF PRESSURE DOORS AND PRESSURE DOOR EQUIPMENTS INCORPORATING SAID CONTROL DEVICES

In the conventional device for controlling the opening and closing of a double pressure door installed for example in a reactor containment vessel, two handlewheel systems are provided in order to open and close the outer and inner pressure doors and are interlocked with each other through suitable means such as Geneva mechanism in such a way that both of the handlewheel systems may not be simultaneously operated. However the conventional devices of the type described are complex in assembly, repair, inspection, construction and operation because of the two handlewheel systems.

One of the objects of the present invention is therefore to provide a device for controlling the opening and closing of a pressure door which is simple in construction, assembly, repair and inspection, and is reliable in operation, and a double pressure door equipment incorporating said control device Another object of the present invention is to provide a sequential step control device which may sequentially control a plurality of steps in the predetermined order.

Figure 1:
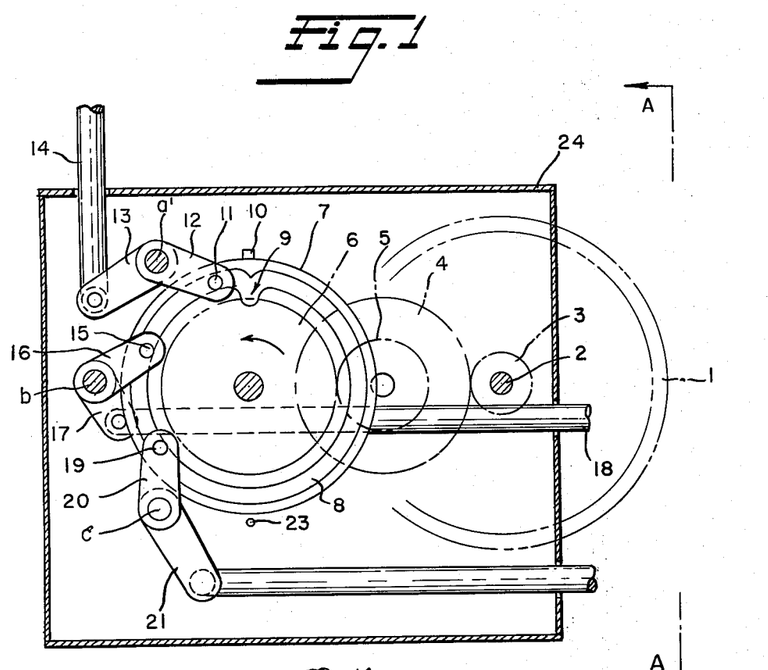
FIG. 1 is a sectional view of a first embodiment of a control device in accordance with the present invention.
Figure 2:
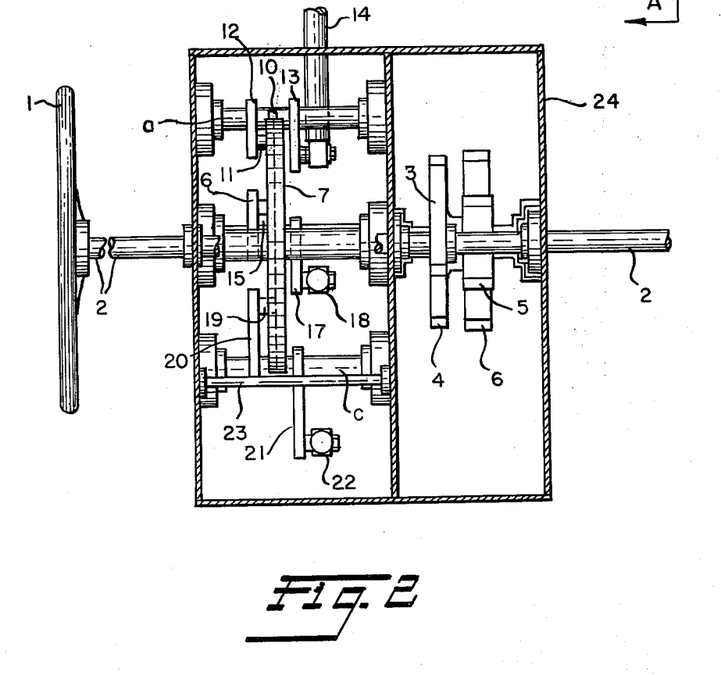
FIG. 2 is a side view thereof looking in the direction indicated by the arrow in FIG. 1.
Figure 3:
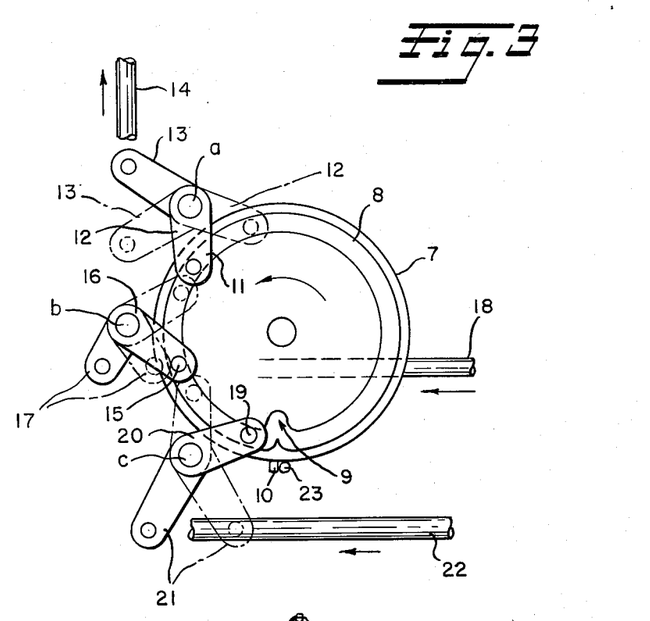
FIG. 3 is a view used for the explanation of the mode of operation of the first embodiment.

The above and other objects, features and advantages of the present invention will become more apparent from the following description of some preferred embodiments thereof taken in conjunction with the accompanying drawings in which:

FIRST EMBODIMENT. FIGS. 1–3

In a device for operating a pressure door shown in FIGS. 1–3, a cam disk 7 with a projection 10 and a second gear 6 are coaxially and rotatably carried by a shaft within a casing 24, and a handlewheel 1 and a first pinion 3 are carried by a handlewheel shaft 2. A first gear 4 which is in mesh with the first pinion 3 and a second pinion 5 which is in mesh with the second gear 6 are carried by an intermediate shaft. Thus the rotation of the handlewheel 1 whose speed is reduced but whose torque is increased may be transmitted to the cam disk 7.

An annular cam groove 8 with a radially inwardly formed recess or cam-follower-displacement portion 9 is formed in one side face of the cam disk 7 coaxially thereof. A plurality of rotary shafts (three shafts in the instant embodiment) $a$, $b$ and $c$ are disposed around the cam disk 7. One end of a lever 12 from the other end of which is extended a pin 11 is fixed securely to the rotary shaft $a$. One end of a lever 13 whose the other end is pivoted to an operating rod 14 is also securely fixed to the rotary shaft $a$. In like manner a lever 16 having a pin 15 and a lever 17 pivoted to a second operating rod 18 are securely fixed to the second rotary shaft $b$, and a lever 20 with a pin 19 and a lever 21 pivoted to a third operating rod 22 are securely fixed to the third rotary shaft $c$. The pins 11, 15 and 19 are slidably fitted into the annular cam groove 8. A stopper 23 is provided for engagement with the projection 10 of the cam disk 7.

Next the mode of operation will be described. When the cam disk 7 is rotated in the counterclockwise direction as indicated by the arrow in FIG. 1, the first pin 11 engages with the recess 9 so that the lever 12 is caused to rotate in the clockwise direction. Therefore the lever 13 is also caused to rotate in the clockwise direction, thereby moving upwardly the first operating rod 14. However the pins 15 and 19 slide in the annular cam groove 8 so that the second and third operating rods 18 and 22 remain stationary. When the cam disk 7 is further rotated in the counterclockwise direction the first pin 11 disengages from the recess 9 and enters again into the cam groove 8 so that the levers 12 and 13 are displaced to the positions indicated by the solid lines in FIG. 3 and remain in these positions when the first pin 11 slides in the cam groove 8. In like manner when the second pin 15 engages with the recess 9 of the cam groove 8, the levers 16 and 17 are caused to rotate in the clockwise direction so that the second operating rod 18 is caused to move to the left in FIG. 1. In like manner when the third pin 19 engages with the recess 9, the third operating rod 22 is also caused to move to the left in FIG. 1. Thus when the cam disk 7 is rotated from the position shown in FIG. 1 to the position shown in FIG. 3, all levers 12, 13, 16, 17, 20 and 21 are held in the operative positions indicated by the solid lines in FIG. 3. After the third pin 19 has passed the recess 9, the projection 10 of the cam disk 7 engages with the stopper 23 so that the further rotation of the cam disk 7 in the counterclockwise direction may be prevented.

As described hereinbefore when the cam disk 7 is rotated through about 180° in the counterclockwise direction, the operating rods 14, 18 and 22 are sequentially displaced into and remain in the operative positions.

Thus when the first operating rod 18 is operatively coupled to an operating rod of a pressure balancing valve of a pressure door and the third operating rod 22 is operatively coupled to a mechanism for opening or closing the pressure door, the opening or closing of the pressure door may be controlled in a simple and easy manner by rotating the handlewheel 1 to rotate the cam disk 7 in the manner described above.

Figure 5:
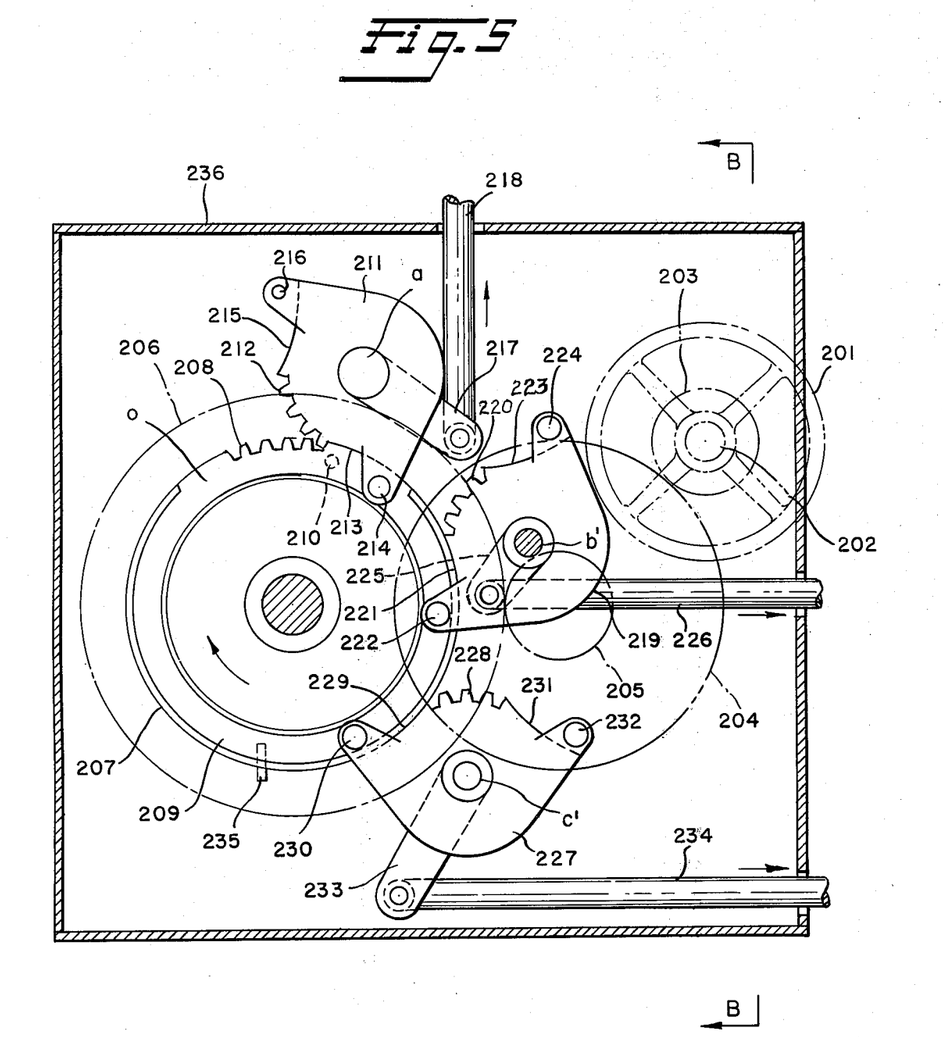
FIG. 5 is a front view of a second embodiment of the present invention.
Figure 6:
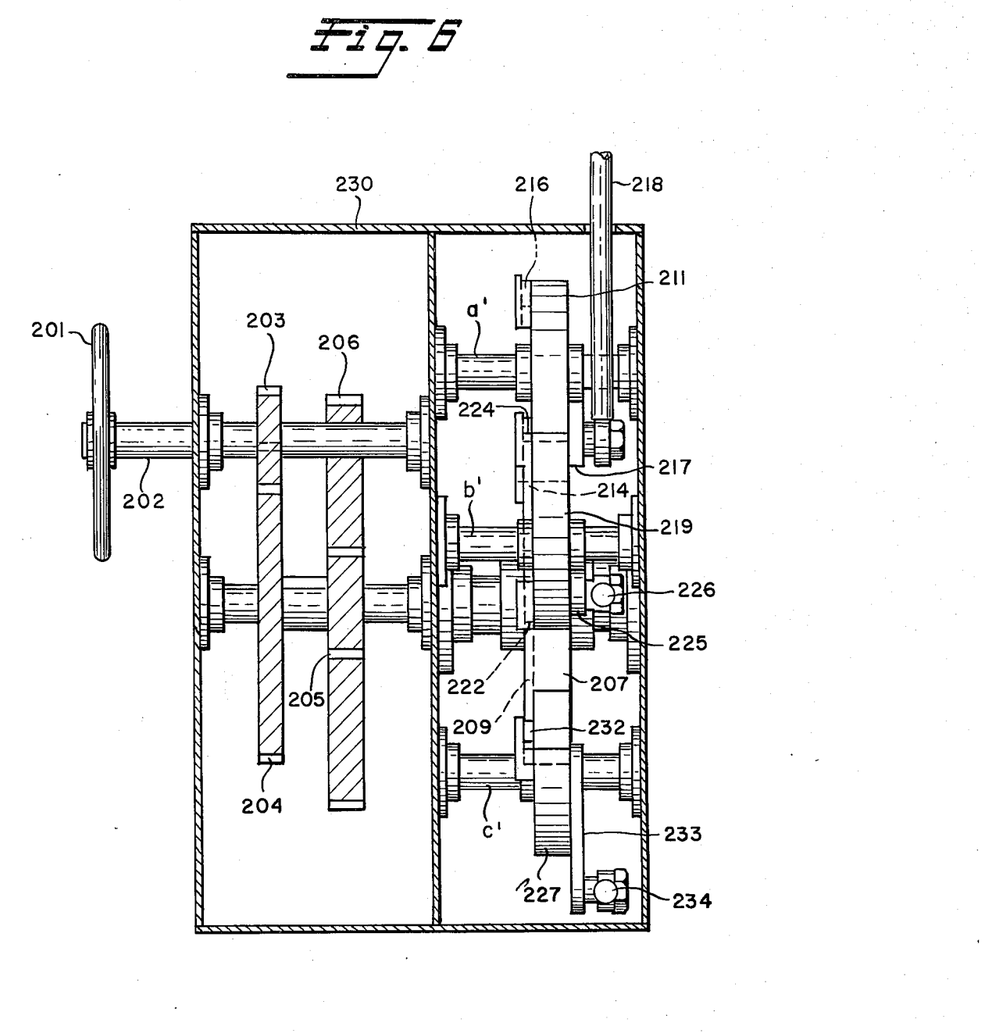
FIG. 6 is a side view thereof looking into the direction indicated by the arrow B in FIG. 5.
Figure 7:
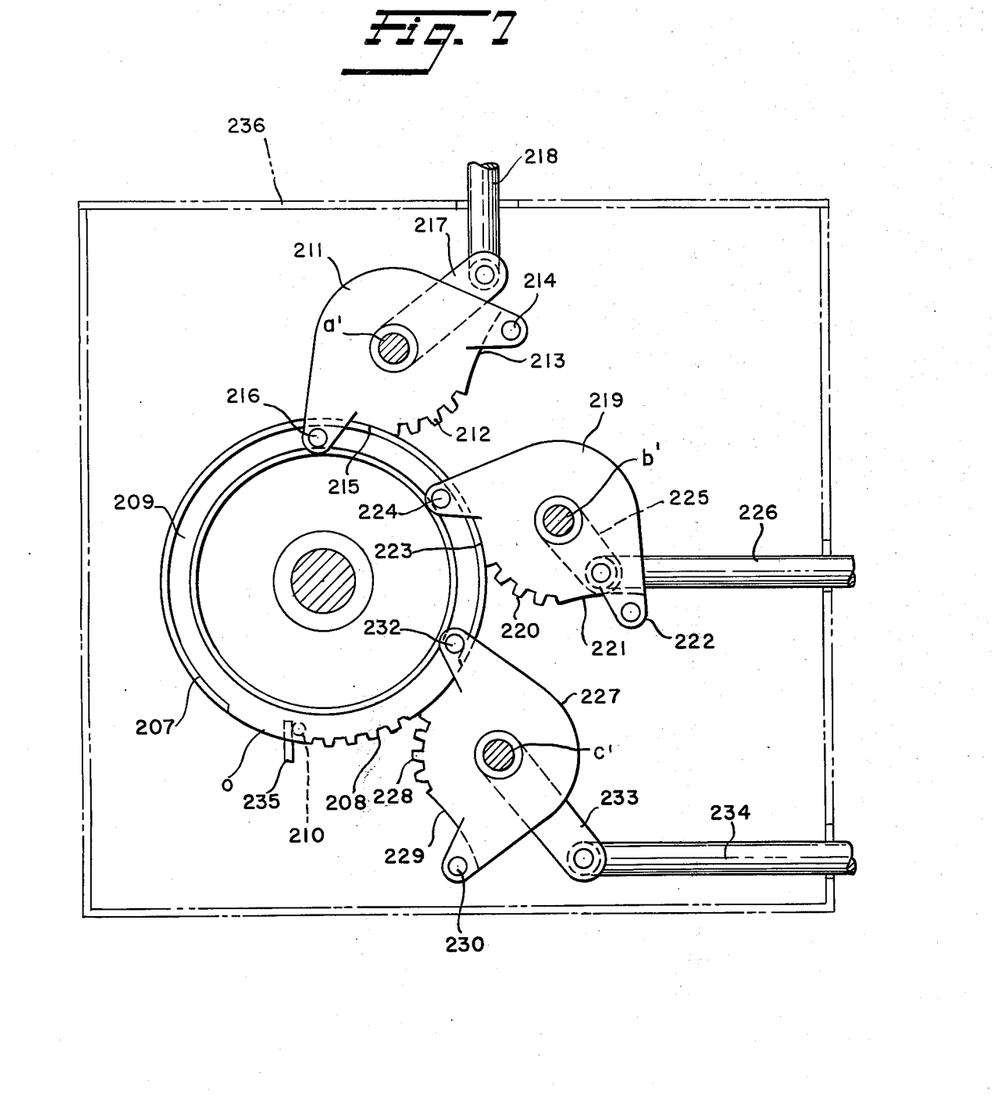
FIG. 7 is a front view similar to FIG. 5 used for the explanation of the mode of operation of the second embodiment.

SECOND EMBODIMENT. FIGS. 5–7

In the second embodiment shown in FIGS. 5–7, within a casing 236 are coaxially and rotatably disposed a cam disk 207 with a projection 210 and a second gear 206, and a handlewheel 201 and a first pinion 203 are carried by a handlewheel shaft 202. A first gear 204 which is in mesh with the first pinion 203 and a second pinion 205 which is in mesh with the second gear 206 are carried by an intermediate shaft within the casing 236. The rotation of the handlewheel 201 is therefore transmitted through the first pinion 203, the first gear 204, the second pinion 205 and the second gear 206 to the cam disk 207 in such a manner that the rotational speed may be reduced while the torque may be increased. Around the periphery of the cam disk 207 are formed a plurality of teeth (four in the instant embodiment) 208, and an annular cam groove 209 is formed in one side face of the cam disk 207 coaxially thereof. As best shown in FIG. 5 the outer side wall of the annular cam groove 209 is opened outwardly adjacent to both ends of the toothed portion 208 as indicated by 0.

A plurality of rotary shafts (three in the instant embodiment) $a'$, $b'$ and $c'$ are disposed around the cam disk 207. A cam follower 211 which is securely fixed to the rotary shaft $a'$ has a toothed portion 212 with a plurality of teeth (three in the instant embodiment) for engagement with the teeth 208 of the cam disk 207, a pair of guide surfaces 213 and 215 formed on both sides of the toothed portion 212 in order to guide the cam follower 211 along the periphery of the cam disk 207, and a pair of pins 214 and 216 adapted to be slidably fitted into the annular cam groove 209 of the cam disk 207. A lever 217 has its one end securely fixed to the first rotary shaft $a'$ and its the other end pivoted to a first operating rod 218. Thus when the cam disk 207 is rotated, the cam follower 211 is swung to cause the operating rod 218 to move vertically through the lever 217. In like manner, a second cam follower 219 with a toothed portion 220, a pair of guide surfaces 221 and 223 and a pair of pins 222 and 224 and a lever 225 pivoted to a second operating rod 226 are securely fixed to the second rotary shaft $b'$. In a similar manner a third cam follower 227 with a toothed portion 228, a pair of guide surfaces 229 and 231 and a pair of pins 230 and 232 and a lever 233 pivoted to a third operating rod 234 are securely fixed to the third rotary shaft $c'$. When the toothed portion 212, 220 or 228 of the cam follower 211, 219 or 227 is not in mesh with the toothed portion 208 of the cam disk 207, one of the pair of guide surfaces 213 or 215, 221 or 223 or 229 or 231 is in sliding contact with the periphery of the cam disk 207. However when the toothed portion 212, 220 or 228 comes to mesh with the toothed portion 208 of the cam disk 207, one of the pair of pins 214 or 216, or 222 or 224, or 230 or 232 comes out of the annular cam groove 209 through the opening 0. But as soon as the toothed portion 212, 220 or 228 is out of mesh with the toothed portion 208 of the cam disk 207, the other pin 216 or 214, or 224 or 222 or 232 or 230 enters again into the annular cam groove 209 through the other opening 0. A stopper 235 is provided to prevent the rotation of the cam disk through more than a predetermined angle (180° in the instant embodiment).

Next the mode of operation will be described. When the cam disk 207 is rotated in the clockwise direction as indicated by the arrow in FIG. 5, the toothed portion 208 of the cam disk 207 comes to mesh with the toothed portion 212 of the first cam follower 211 so that the latter is caused to rotate in the counterclockwise direction about the first rotary shaft $a'$ and the pin 214 comes out of the cam groove 209. As long as the toothed portion 208 of the cam disk 207 is in mesh with the toothed portion 212 of the cam follower 211, the cam follower 211 is caused to rotate in the counterclockwise direction so that the lever 217 is also caused to rotate in the counterclockwise direction. As a result the first operating rod 218 is caused to move upwardly in FIG. 1. The pins 222 and 230 of the second and third cam followers 219 and 227 slide through the cam groove 209 and the guide surfaces 221 and 229 also slide around the periphery of the cam disk 207 so that the second and third cam followers 219 and 227 remain stationary. Therefore the second and third operating rods 226 and 234 also remain stationary.

As soon as the toothed portion 212 of the first cam follower 211 comes out of mesh with the toothed portion 208 of the cam disk 207, the pin 216 enters into the cam groove 209 through the opening 0 and the rotations of the first cam follower 211 and the lever 217 are stopped, so that they are held in the positions shown in FIG. 7. Thus the first operating rod 218 is also held in the raised position shown in FIG. 7. Even when the cam disk 207 is further rotated in the clockwise direction, the pin 216 of the first cam follower 211 remains in sliding contact with the cam groove 209 while the guide surface 215 is in sliding contact with the periphery of the cam disk 207 so that the cam follower 211 and hence the lever 217 and the first operating rod 218 may be held stationary. The toothed portions 220 and 228 of the second and third cam followers 219 and 227 are sequentially made into mesh with the toothed portion 208 of the cam disk 207 so that the second and third cam followers 219 and 227 are caused to rotate in the counterclockwise direction to cause the second and third operating rods 226 and 234 to move to the right in FIG. 5 and hold them in the positions shown in FIG. 7 in a manner substantially similar to that described above with reference to the first cam follower 211. When the toothed portion 228 of the third cam follower 227 comes out of mesh with the toothed portion 208 of the cam disk 207 so that the third operating rod 234 is held in the position shown in FIG. 7 the projection 210 of the cam disk 207 engages with the stopper 235 so that the further rotation of the cam disk 207 in the clockwise direction may be prevented.

Thus as the cam disk 207 is rotated through about 180°, the first, second and third operating rods 218, 226 and 234 are sequentially displaced to and held in the operative positions. It is readily seen that the operating rods 218, 226 and 234 are also sequentially returned to their initial positions when the cam disk 207 is rotated in the counterclockwise direction.

PRESSURE DOORS

Next the pressure door with the control device of the types described above will be described hereinafter. Since the three operating rods are sequentially actuated by the rotation of the cam disk through 180°, the rotation of the cam disk through further 180° may be utilized to actuate further three operating rods. Therefore the interlocking system between two handlewheels for a double pressure door may be eliminated. In other words, only one handlewheel or door control system is required for a double pressure door.

In a reactor containment vessel, a lock is installed at the entrance in order to ensure the airtightness of the vessel. When an outer door of the lock is opened, an inner door is tightly closed, and the inner door is opened only after the outer door is tightly closed so that the interior of the containing vessel may not be directly communicated with the surrounding atmosphere.

For example when an accident happens in a nuclear reactor when an operator is within a containment vessel, the pressure within the containing vessel increases by about two atoms, and the temperature is also increased. In case of immediate escape of the operator out of the containment vessel, the spreading of radioactivity must be prevented. Furthermore when a reactor accident happens, the electric and other power sources are generally cut off so that the double pressure door must be opened and closed manually.

In general when the double pressure door is opened and closed, the following conditions must be satisfied:

i. The pressure doors must be manually opened and closed within a short time.

ii. The outer and inner doors must not be opened simultaneously even in case of emergency.

iii. The outer and inner doors of the lock must be opened and closed from the interior of an air-tight or reactor containment vessel, from the lock and from the exterior of the vessel. That is, it is imperative to prevent such an accident that the operator within the vessel cannot open the inner door because the outer door is closed.

iv. When the doors are to be opened by actuating a pressure equalizing valve, a door locking mechanism and a door control mechanism in the order named, the pressure equalizing valve is opened to equalize the pressure inside the lock or vessel with the atmospheric pressure or the pressure inside the lock and then the door locking mechanism is released to open the door. On the other hand when the door is to be closed, the door must be closed first, and the initial pressure is exerted to the packing of the door by the door locking mechanism to ensure the airtightness of the door. Thereafter the door is held in a normal closed position and then the pressure equalizing valve is closed.

Figure 4:
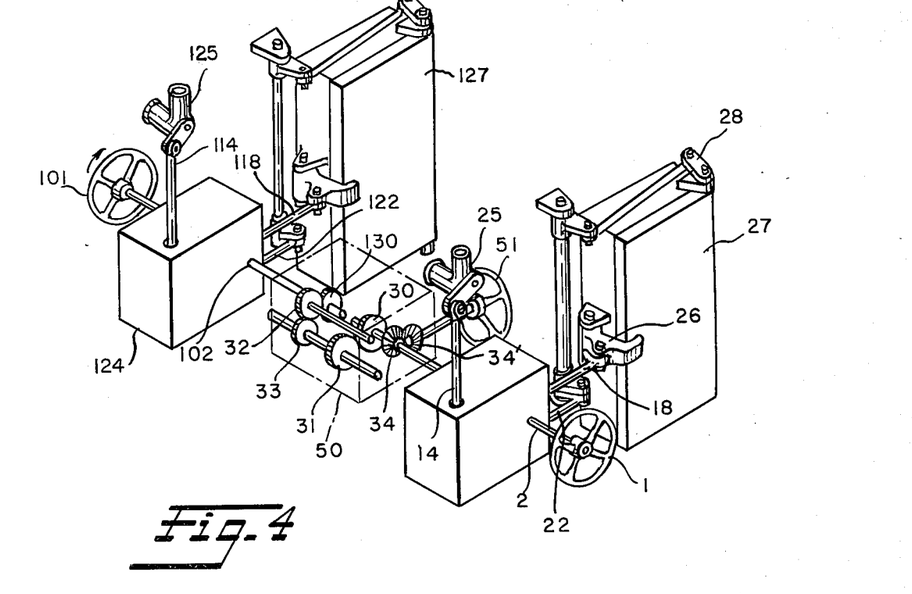
FIG. 4 is a perspective view of a double pressure equipment incorporating the control devices of the type shown in FIGS. 1–3.

FIRST EMBODIMENT OF DOUBLE PRESSURE EQUIPMENT. FIG. 4

The double pressure equipment shown in FIG. 4 incorporates two pressure door control devices of the type described with reference to FIGS. 1–3. The first door control device has its first, second and third operating rods 14, 18 and 22 operatively coupled through suitable linkages to a pressure equalizing valve 25, a locking mechanism 26 of an inner door 27 and a door control or opening and closing mechanism 27, 28 respectively. A gear 30 is carried at the end of the handlewheel shaft 2 remote from the handlewheel 1. The other door control device for an outer door 127 has its operating rods 114, 118 and 122 operatively coupled through suitable linkages to a pressure equalizing valve 125, a locking mechanism 126 of the outer door 127 and a door control or opening and closing mechanism 128, respectively. A gear 130 is carried at the end of a handlewheel shaft 102 extended out of a casing 124 of the other door control device.

The handlewheel shafts 2 and 102 are drivingly coupled to each other through a reverse device generally indicated by 50 and comprising a plurality of gears. An intermediate handlewheel 51 inside the lock between the outer and inner doors 127 and 27 is operatively coupled to the handlewheel shaft 2 through bevel gears 34 and 34', the former being carried by the shaft 2 while the latter by a shaft of the intermediate handlewheel 51. Thus the outer and inner doors 127 and 27 may be controlled from the inside of the lock.

Within the reverse device 50 the gear 130 carried by the handlewheel shaft 102 is in mesh with a gear 32 which in turn is in mesh with a gear 33 carried by a shaft which also carries a gear 31 in mesh with the gear 30 carried by the handlewheel shaft 2. Thus the handlewheel shafts 2 and 102 are operatively coupled to each other through the gears 30, 31, 33, 32 and 130 so that when one of the handlewheels is rotated in one direction the other handlewheel is rotated in the opposite direction.

Next the mode of operation will be described hereinafter. When the handlewheel 1 inside the vessel is rotated in the counterclockwise direction, the first operating rod 14 is moved upwardly in the manner described hereinbefore to open the pressure equalizing valve 25. Thereafter the operating rod 18 is displaced to the left to release the door locking mechanism 26 from the inner door 27. Thereafter the third operating rod 22 is displaced to the left to actuate the door opening and closing mechanism 28, thereby opening the inner door 27. While the inner handlewheel 1 is rotated in the counterclockwise direction, the outer handlewheel 101 is rotated in the clockwise direction so that the cam disk 7 in the outer door control device is also rotated in the clockwise direction in which the pins 11, 15 and 19 of the levers 12, 16 and 20 will not engage with the recess 9 of the cam groove 8 of the cam disk 7. As a result the operating rods 14, 18 and 22 are held stationary so that the outer pressure door 127 remains tightly closed.

When the inner pressure door 27 is opened, the projection 10 of the cam disk 7 engages with the stopper 23 so that the further rotation of the handlewheel 1 in the counterclockwise direction may be prevented.

The operator enters into the lock and rotates the intermediate handlewheel 51 in the clockwise direction viewed from the operator (the handlewheel 51 being prevented from rotating in the counterclockwise direction because the inner pressure door 27 is opened) so that the inner handlewheel 1 is rotated in the clockwise direction. As a result the cam disk 7 within the inner door control device is also rotated in the clockwise direction so that the third operating rod 22 is first displaced to the right to close the inner door 27. Thereafter the second operating rod 18 is displaced to the initial position to actuate the locking mechanism 26 to airtightly close the inner pressure door 27, and then the first operating rod 14 is returned to its initial position to close the pressure equalizing valve 25. The cam disks 7 in the inner and outer door control devices are returned to the initial positions shown in FIG. 1. That is, the recess 9 of the annular cam groove 8 is at the top.

When the operator further rotates the intermediate handlewheel 51 in the clockwise direction, the cam disk 7 in the inner door control device rotates also in the clockwise direction in which the pins 11, 15 and 19 will not engage with the recess 9 of the annular cam groove 8 of the cam disk 7. Therefore the operating rods 14, 18 and 22 are held in the inoperative positions so that the inner pressure door 27 remains tightly closed. On the other hand the cam disk 7 in the outer door control device is rotated in the counterclockwise direction so that the cam disk 7 is also rotated in the counterclockwise direction in which the pins 11, 15 and 19 engage with the recess 9 of the annular cam groove 8. Therefore the first operating rod 114 is moved upwardly to open the pressure equalizing valve 125, and then the second operating rod 118 is displaced to the left to release the locking mechanism 126 from the outer pressure door 127. Finally the third operating rod 122 is displaced to the left to open the outer pressure door 127.

The operator now comes out of the lock and rotates the outer handlewheel 104 in the counterclockwise direction viewed from the operator (the projection 10 of the cam disk 7 being engagement with the stopper 23 so that the handlewheel 101 is prevented from rotating in the clockwise direction) so that the outer pressure door 127 is closed in a manner substantially similar to that described with reference to the inner pressure door 27. Thus both the inner and outer pressure doors 27 and 127 may be securely closed.

Figure 8:
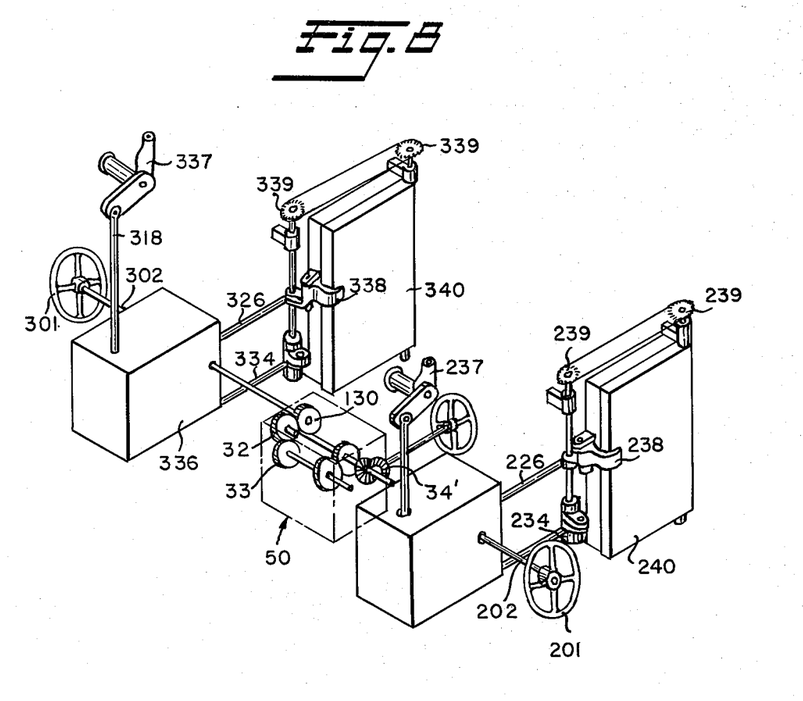
FIG. 8 is a perspective view of a double pressure door equipment incorporating the control devices of the type shown in FIGS. 5–7.

SECOND EMBODIMENT OF DOUBLE PRESSURE DOOR EQUIPMENT. FIG. 8

The double pressure door equipment shown in FIG. 8 incorporates a pair of inner and outer door control devices described hereinbefore with reference to FIGS. 5–7.

The second embodiment is substantially similar in construction to the first embodiment described hereinbefore with reference to FIG. 4 except that the control device of the type described with reference to FIGS. 5–7 is incorporated and the door opening and closing mechanism comprises a chain drive consisting of a pair of spaced apart sprocket wheels 239 and an endless chain wrapped therearound.

The operating rods 218, 226 and 234 of the inner door control device are operatively coupled through suitable linkages or gear trains (not shown) to a pressure equalizing valve 237, a door locking mechanism 238 and a sprocket wheel 239, respectively. In like manner, the operating rods 318, 326 and 324 of the outer door control device are operatively coupled to a pressure equalizing valve 337, a door locking mechanism 338 of an outer pressure door 340 and a sprocket wheel 339 of a door opening and closing mechanism, respectively. Like the first embodiment the inner and outer handlewheels 201 and 301 are operatively coupled to each other through their respective handlewheel shafts 202 and 302 through the reverse device 50 described hereinbefore with reference to FIG. 4. The intermediate handlewheel 51 is operatively coupled to the outer and inner handlewheels 301 and 201 in the manner described hereinbefore with reference to FIG. 4. Thus the outer and inner pressure doors 340 and 240 may be opened and closed from the inside of the lock therebetween.

The mode of operation is substantially similar to that of the first embodiment described hereinbefore with reference to FIG. 4. When the inner handlewheel 201 is rotated in the clockwise direction, the cam disk 207 (See FIGS. 5–7) is also rotated in the clockwise direction so that the first operating rod 218 is moved upwardly to open the pressure equalizing valve 237. Thereafter the second operating rod 226 is displaced to the right to release the door locking mechanism 228, and thereafter the third operating rod 234 is also displaced to the right to open the inner pressure door 240. Since the outer handlewheel 301 is rotated in the counterclockwise direction viewed from the inner handlewheel 201 when the latter is rotated in the clockwise direction, so that the cam disk 207 in the outer door control device is also rotated in the counterclockwise direction in which the toothed portions 212, 220 and 208 of the cam followers 211, 219 and 227 (See FIG. 5) will not mesh with the toothed portion 208 of the cam disk 207. Therefore the pins 214, 222 and 230 slide in the annular cam groove 209 as the cam disk 207 rotates so that the operating rods 318, 326 and 334 are held stationary. The outer pressure door 340 remains therefore tightly closed while the inner pressure door 240 is opened.

When the inner door 240 is opened, the pin 210 of the cam disk 207 (See FIG. 5) engages with the stopper 235 so that the inner handlewheel 201 may be prevented from being further rotated in the clockwise direction.

The operator enters into the lock between the outer and inner pressure doors 340 and 240 and rotates the intermediate handlewheel 51 in the counterclockwise direction viewed from the operator (the intermediate handlewheel 51 being prevented from rotating in the clockwise direction because the inner pressure door 240 is opened) so that the handlewheel 201 in the inner door control device is rotated in the counterclockwise direction. The rod 234 is displaced to the left to the initial position to close the inner pressure door 240, and thereafter the rod 226 is returned to the initial position to actuate the door locking mechanism 238. Then the operating rod 218 is moved downwardly to the initial position to close the pressure equalizing valve 237. Thus the cam disks 207 in the inner and outer door control devices, that is within the casings 236 and 336 are returned to their initial positions shown in FIG. 5. That is, the toothed portion 208 of the cam disk 207 is at the top.

When the intermediate handlewheel 51 is further rotated in the counterclockwise direction, the cam disk 207 in the inner door control device is rotated in the counterclockwise direction in which the toothed portions 212, 220 and 228 (See FIG. 5) will not engage with the toothed portion 208 of the cam disk 207. Therefore the operating rods 218, 226 and 234 of the inner door control device remain in the inoperative position so that the inner pressure door 240 remains tightly closed. However the cam disk 207 in the outer door control device is rotated in the clockwise direction viewed from the inner handlewheel 201 because the reverse device 50 is interposed between the inner and outer handlewheels 201 and 301. Therefore the toothed portions of the cam followers 211, 219 and 227 in the outer door control device engage with the toothed portion 208 of the cam disk 207. The operating rods 318, 326 and 234 are therefore sequentially actuated to open the pressure equalizing valve 337, to release the door locking mechanism 338 and to open the outer pressure door 340.

The operator comes out of the lock and rotates the outer handlewheel 301 in the clockwise direction (the rotation in the clockwise direction of the outer handlewheel 301 of the outer door control device being prevented because the pin 210 of the cam disk 207 in the outer door control device is in engagement with the stopper 235). The outer door 340 is therefore tightly closed in a manner substantially similar to that described hereinbefore. Thus both the inner and outer pressure doors 240 and 340 may be securely closed.

As described hereinbefore the inner handlewheel 1 or 201, the intermediate handle wheel 51 and the outer handlewheel 101 or 301 are interlocked with each other so that the operator inside the vessel may securely close the outer pressure door 127 or 340 by rotating the inner handlewheel 1 or 201 in the counterclockwise or clockwise direction. The door interlocking mechanism 126 or 338 applies the pressure to the door 127 or 340 to secure the airtightness and the pressure equalizing valve 125 or 337 is closed. When the inner handlewheel 1 or 201 is rotated in the opposite direction the inner pressure door 27 or 240 is opened in the manner described hereinbefore.

Figures 9, 10:
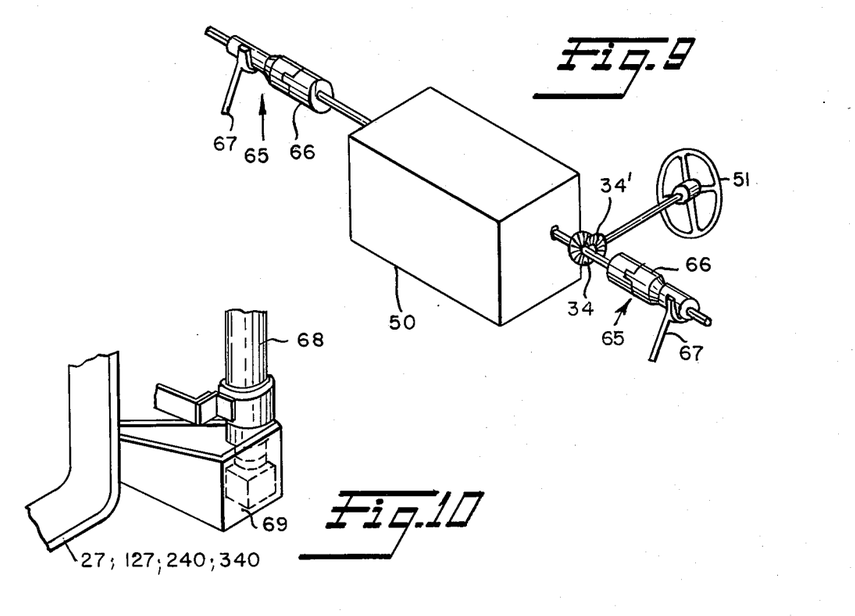
FIG. 9 is a perspective view illustrating a mechanism for permitting the simultaneous opening of the outer and inner doors of the double pressure door equipment shown in FIG. 4 or FIG. 8.
FIG. 10 is a perspective view illustrating damping means in accordance with the present invention.

MECHANISM FOR PERMITTING SIMULTANEOUS OPENING OF OUTER AND INNER PRESSURE DOOR IN CASE OF EMERGENCY. FIG. 9

Next a mechanism for permitting the simultaneous opening of the outer and inner pressure doors in case of an emergency will be described hereinafter. This mechanism is used when the outer and inner pressure doors cannot be opened and closed in the normal manner described hereinbefore due to some accidents or when both the outer and inner pressure doors must be opened at the same time because of a periodic inspection or the like.

The mechanism generally indicated by 65 in FIG. 9 generally comprises a clutch 66 and a fork 67, and two clutch mechanisms 65 are disposed on both sides of the reverse device 50 in such a way that when the operating forks 67 are shifted, the clutches 66 are disengaged to release the interlock between the outer and inner handlewheels.

In order to open the inner door 27, 240 while keeping the outer doors 127, 340 open, the fork 67 on the side of the outer door mounted beside the reverse device 50 placed between the two doors is actuated so as to operate the clutch 66 and to disengage the clutch from the shaft.

DAMPING DEVICE. FIG. 10

A damping device 69 may be attached to the lower end of a shaft 68 of hinged arms in order to absorb the impact produced when the outer or inner pressure door 27, 127, 240 or 340 is opened or closed.

In the above embodiments, the two door control devices of the present invention are used to open and close the outer and inner pressure doors, but it is to be understood that the door control devices of the present invention may be used to close and open a plurality of pressure doors in a predetermined sequence.

The following would be easily understood: One single unit of said control device can be used as a control device for a single pressure door; n units of the opening and closing device of this invention are used, wherein three rods are installed at suitable intervals within the predetermined rotary angle around one cam disk; each of the n units of said control device is suitably matched with each of the corresponding pressure doors; the n pressure doors constituting the set are opened or closed one after another by rotating 360°/n the cam disk of the cotrol devices; in this way the machine for opening and closing sets of n pressure doors can be constituted. In the above embodiments the door control devices have been described as having three operating rods, but it is to be understood that a plurality of operating rods more than three may be used depending upon the number of sequential steps to be controlled. Furthermore, it is understood that the control devices of the present invention may be used for various devices, apparatus or equipment other than the pressure door equipments described above.

The advantages of the sequential control devices and the double pressure door equipment incorporating the sequential control devices in accordance with the present invention may be summarized as follows:

I. As compared with the conventional sequential control devices, those of the present invention are simple in mechanism and easy to assemble, repair and inspect. The sequential control devices of the present invention are therefore very economical.

II. Operation is very reliable, dependable and easy especially in the sequential control device described with reference to FIGS. 5–7 and of the type having the cam followers.

III. A plurality of pressure doors of a reactor containment vessel or the like may be sequentially controlled by a single handlewheel operating system simple in construction. Erratic operations in which a plurality of pressure doors are opened simultaneously may be positively prevented.

IV. When the clutch mechanisms are inserted, a plurality of pressure doors may be opened or closed independently of each other.

V. When the damping devices are inserted, the impacts of the pressure doors produced when they are opened or closed may be effectively absorbed.

What is claimed is:

1. A device for controlling a plurality of operation steps in a predetermined sequential order comprising;
   a. a handlewheel,
   b. a cam disk operatively coupled to said handlewheel through reduction gear means and provided with a cam surface having one cam follower displacing protion,
   c. a plurality of cam followers located around said cam disk and spaced apart from each other by a predetermined distance in such a way that said plurality of cam followers may be displaced sequentially in a predetermined order as said cam disk is rotated by said handlewheel in one direction through a predetermined angle, and
   d. lever means operatively coupling each of said plurality of cam followers to an operating rod,
   whereby when said plurality of cam followers engage with said cam follower displacing portion of said cam disk as said cam disk rotates in said one direction, said operating rods coupled to said plurality of cam followers may be sequentially displaced in a predetermined direction.

2. A device for controlling the opening or closing of a pressure door or the like wherein a cam disk is rotatable in response to the rotation of a handlewheel through a reduction gear means; an annular cam groove is formed in one side face of said cam disk coaxially thereof; pins are disposed so as to be slidable in said annular cam groove; a plurality of linkages in each of which an operating rod is pivoted to a rotary shaft about which each of said pins rotates are disposed around said cam disk in spaced relation with each other in such a way that said linkages may be actuated by the rotation of said rotary shafts which in turn are rotated by the rotation in one direction of said cam disk through said pins; and said linkages may be held stationary until said cam disk and hence said pins are rotated in the opposite direction.

3. A device as defined in claim 2 wherein a portion of said annular cam groove is curved radially inwardly; a plurality of linkages in each of which each of said pins is fixed to one end of each linkage and said operating rod is pivoted to the other end thereof are disposed around said cam disk and spaced apart from each other by a predetermined distance, whereby each of said linkages may be actuated as said pin of each linkage passes through said radially inwardly curved portion as said cam disk is rotated.

4. A device as defined in claim 2 wherein a toothed portion with a plurality of teeth is formed at a suitable portion of the periphery of said cam disk; a plurality of cam followers are disposed around said cam disk and spaced apart from each other by a predetermined distance, each of said cam followers comprises a pair of spaced apart pins one of which is selectively slidably fitted into said annular cam groove and which are operatively coupled through a lever linkage to each of said operating rods, and a plurality of toothed portions formed on the peripheral surface of each of said cam followers whereby said toothed portions of said plurality of cam followers are sequentially engaged with said toothed portion of said cam disk as said cam disk is rotated, thereby rotating said cam followers.

* * * * *